UNITED STATES PATENT OFFICE.

JOHN W. OSBORNE, OF WASHINGTON, DISTRICT OF COLUMBIA.

SURFACE TREATMENT OF MOVABLE TYPE.

SPECIFICATION forming part of Letters Patent No. 553,312, dated January 21, 1896.

Application filed January 30, 1895. Serial No. 536,711. (No specimens.)

*To all whom it may concern:*

Be it known that I, JOHN W. OSBORNE, a subject of the Queen of Great Britain, and a resident of Washington, in the District of Columbia, have invented a new and useful Process for the Surface Treatment of Movable Types, of which the following is a specification.

This invention has for its object the production of a modified surface on the bodies of movable type of a nature adapted to hinder the close adhesion of the same after having been locked in a chase.

When perfectly new type arranged as matter for printing are forcibly wedged together by quoins in a chase or otherwise, they will be found to stick to each other and form a more or less cohesive mass. The force required to separate such type will bear some relation to the lateral pressure to which they have been subjected, and also to the time during which the pressure has been maintained. These facts have been known to practical printers and the evils resulting from them are all increased when the matter, set and locked as described, is subjected to the papier-maché stereotyping process. In this process the form of type is heated to about 300° Fahrenheit, for the purpose of drying the wet sheet of paper which has been beaten or rolled down upon the letters, where it is maintained for several minutes till all the water has been driven off, and the adhesion between the type-bodies is very much increased by reason of the high temperature to which they are thus subjected. In the case of movable types that are in use for printing purposes the adhesion into solid masses is still further increased by reasons which I have found to depend on other causes. When matter has been set by the compositor and before it is printed, several proofs are required, after each of which the ink remaining on the type is removed by some suitable solvent, which, when the form is to be stereotyped, is best done by benzine. This fluid dissolves the varnish in the ink and carries the solution between the type-bodies, where it helps, when heated, to still further cement the type together. Such cause of adhesion, however, though it is one which cannot be ignored, may be regarded as of less practical importance than the initial metallic adhesion above referred to, which seems to be molecular in its nature, depending largely on the purity and perfect evenness which type-founders are now able to give to their manufactures, accomplishing as they do a degree of parallelism and uniformity which is amazingly great. I overcome the evils due to such contact adhesion by treating the surfaces of the movable types chemically, so as to destroy their metallic purity and interpose between two adjacent type-bodies an infinitesimal film of a non-metallic nature supplied in part, at least, by the type-metal alloy itself. This can be accomplished in several ways, but the following is the most efficient and satisfactory method known to me, taking all the conditions into account:

I make a solution of perchloride of iron by dissolving the salt in water, using about two parts by weight of the former to ninety-eight of the latter. The strength of this solution is chiefly a matter of convenience. If made much stronger than that here given the action on the type will be energetic and must be proportionately shortened. If it is much weaker provision must be made for allowing the type to remain a long time immersed; but in either case the type must be treated in loose masses and must be moved about while the action on its surface is going on, so as to prevent stagnation of the fluid, and the more energetic the chemical action the more rapid must such movement be.

For immersion the loose types may be contained in perforated boxes, or baskets of wire-cloth will be found convenient for dipping them in the solution and afterward in water for washing. When dried they are fit for immediate use, the bright metallic character of the surfaces which lie against each other in set-up matter being radically changed. During this process the apparent change produced upon the type consists at first of a dulling of the surface, followed by a gradual darkening until a dull-gray black is produced; but the process may be safely stopped before the deepest color is reached. Type so treated and dried will not stick together when locked up and heated on the steam-table in the usual way. The nature of the chemical action in this procedure will be understood approximately when it is remembered that part of the chlorine in the iron compound is available as a solvent for certain constituents of the type and for combination with the lead forming the larger part of the type-metal with which it forms an insoluble chloride, while the chlorides of antimony and tin, though soluble, may yet remain behind in part adherent to the surface as insoluble oxychlorides. It will thus appear that in addition to the slight roughening of the metallic surfaces an infinitesimal film of non-metallic material will be interposed between the type-bodies when they are set and locked as matter for printing. Independently, however, of any chemical explanation the behavior of the type will prove that intimate contact is prevented by the alteration which the type has undergone, and it will be found that not only are the evils due to initial adhesion obviated, but that also, after inking, proving, and washing the form with benzine, adhesion shows itself but slightly, if at all. It sometimes happens, however, that a great many proofs are taken from a form before stereotyping, and also that after stereotyping other proofs may be required, and second and even third stereotypes may be prepared from the same matter before distributing the same. The repeated inkings and washings in such cases are calculated to carry a considerable amount of adhesive material between the types by reason of the capillary action on the benzine used, and under such circumstances more adhesion is likely to arise. I overcome this difficulty by removing the remaining ink after each proof, not by a solvent, but by mechanical means. This is best accomplished by printing a second or third proof without previous inking after the first. Soft paper can be used for this purpose, or cotton cloth, either dry or dampened. After the stereotyping process is finally finished and just before distribution, the type may be washed with benzine to prevent any gradual filling of the letters which might take place in course of time.

As before stated, there are many substances acting in an analogous manner which may be used to produce an effect similar to that following the treatment with the perchloride-of-iron solution. Chief among these may be cited the sulphides of the alkaline metals which give rise to adhesive deposits of lead sulphide, and possibly of the other two metals in the type. Silver nitrate may also be used which acts energetically on the surface, depositing metallic silver and the oxides of antimony and tin. Corrosive sublimate, a weak solution of iodine and some of the stronger mineral acids—as, for instance, hydrochloric acid—may also be employed, but the latter must be used with great care to prevent injury to the type. Even then they are not as satisfactory in their general behavior, harmlessness, and convenience as the iron salt the application of which I have fully described.

In addition to the advantages secured by my invention, I accomplish incidentally what is also of much value to the compositor—namely, the dulling and darkening of the type, which, when new, affect the eyes very injuriously, as is well known.

As already indicated the changes in the surfaces of the type-bodies due to the chemicals named or their equivalents are minute in quantity, the film of non-metallic matter produced being infinitely thin, hardly destroying the polish on the metal, and although such changes are produced more by the addition and combination of chlorine (or of sulphur, iodine, oxygen, &c.) than by the removal of anything, I shall nevertheless define the effect produced as the "corrosive" action of the chemical solution employed, and the surface of the type after treatment as a "corroded" surface. This corrosion, when stopped at the right time, does not injure the face of the letters; still the appearance of the type is better when the letter-faces are not blackened. When such a modification of my process is desired, I effect the protection of the printing-surface perfectly by applying thereto with a roller or dabber a coating of any suitable resist, such as thick shellac or asphalt varnish, and letting it dry before the blackening process is gone on with. To remove such protection afterward, it is best to again assemble the type in a galley and then dissolve and wipe off the resinous matter with a cloth dampened with the proper solvent.

Having thus described my invention and the best manner in which the same should be carried out, I wish it understood that I do not confine myself to the specific means herein cited so long as the principles involved in my process are maintained, for it is obvious that the details necessary for the destruction of the pure metallic surface, the selection of certain elements thereof, and the deposition therewith of extraneous matter adherent upon the alloy may be very much varied without departing from the intrinsic nature of the invention.

What I claim is—

1. The method of treating the surfaces of movable types which consists in destroying the pure metallic nature of such surfaces by applying a chemical of the character described thereto for their superficial corrosion; substantially as described.

2. The method of treating the surfaces of movable types which consists in applying thereto a corrosive chemical which combines with one or more of the constituents of the type metal to form an adhering film; substantially as described.

3. The method of treating movable types which consists in first protecting the faces, and then treating the bodies with a corrosive chemical which forms a solid insoluble compound with one or more of the metals in the alloy of which the types are made; substantially as described.

4. The method of treating movable types which consists in immersing them in a weak solution of perchloride of iron; then washing them in water, and finally drying them for use; substantially as described.

5. The method of treating movable types which consists in first protecting the face of each letter by a suitable resist applied thereto; then immersing them loosely in water containing about two per cent. of perchloride of iron; then agitating them therein till of a gray black color; then washing and drying them, and finally removing the resist from the letter faces with a suitable solvent; substantially as described.

6. As an article of manufacture, a type for printing provided on all sides of its body with a film formed by corroding the type by subjecting it to the action of suitable chemicals, whereby an extraneous substance which is in chemical combination with the substance of the type is provided; substantially as described.

J. W. OSBORNE.

Witnesses:
DAVID STUART WATERS,
W. J. DANTE.